Inventors
Benjamin F. Hart
Roland P. Carlson
by Paul A. Frank
Their Attorney

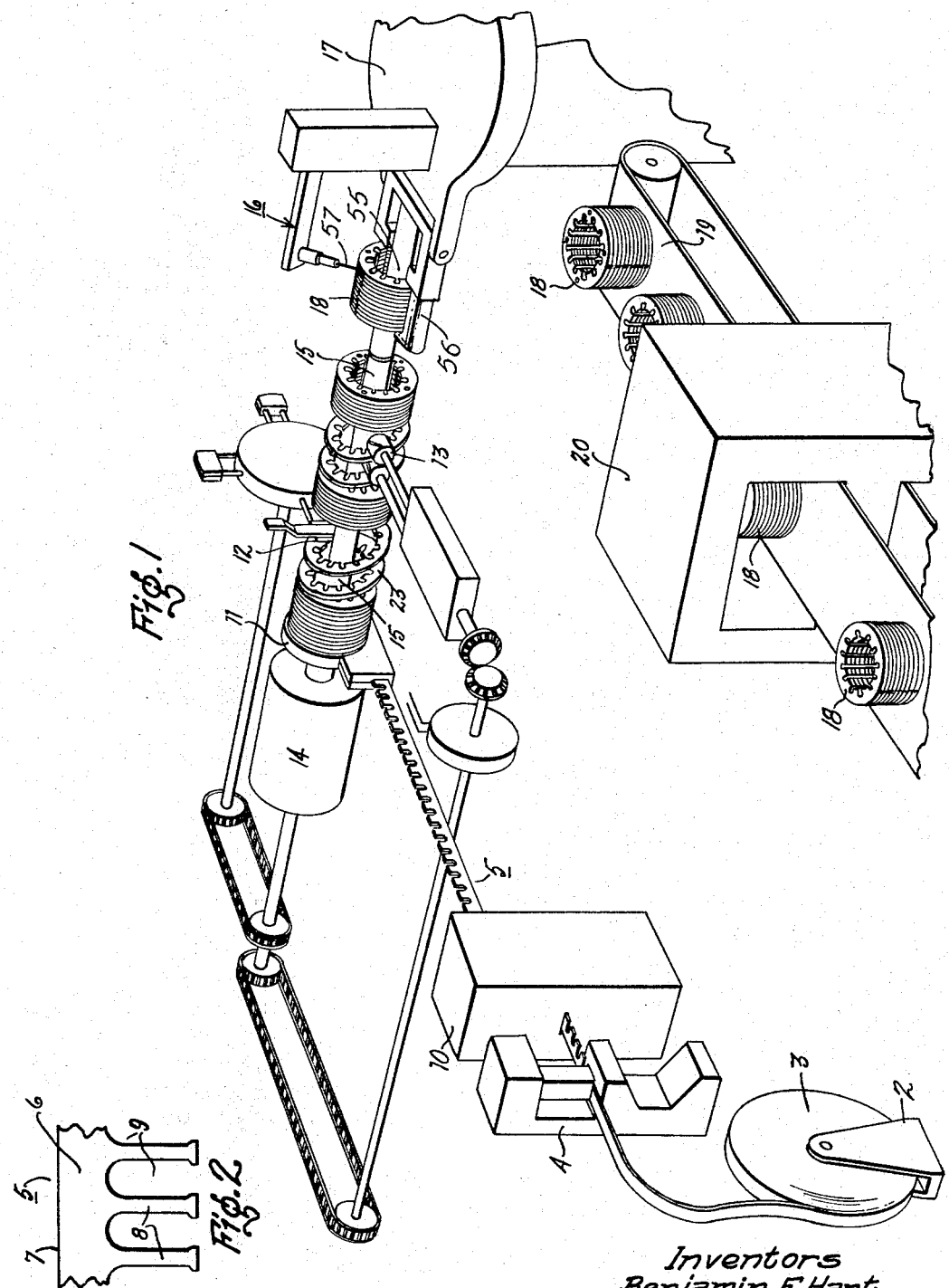

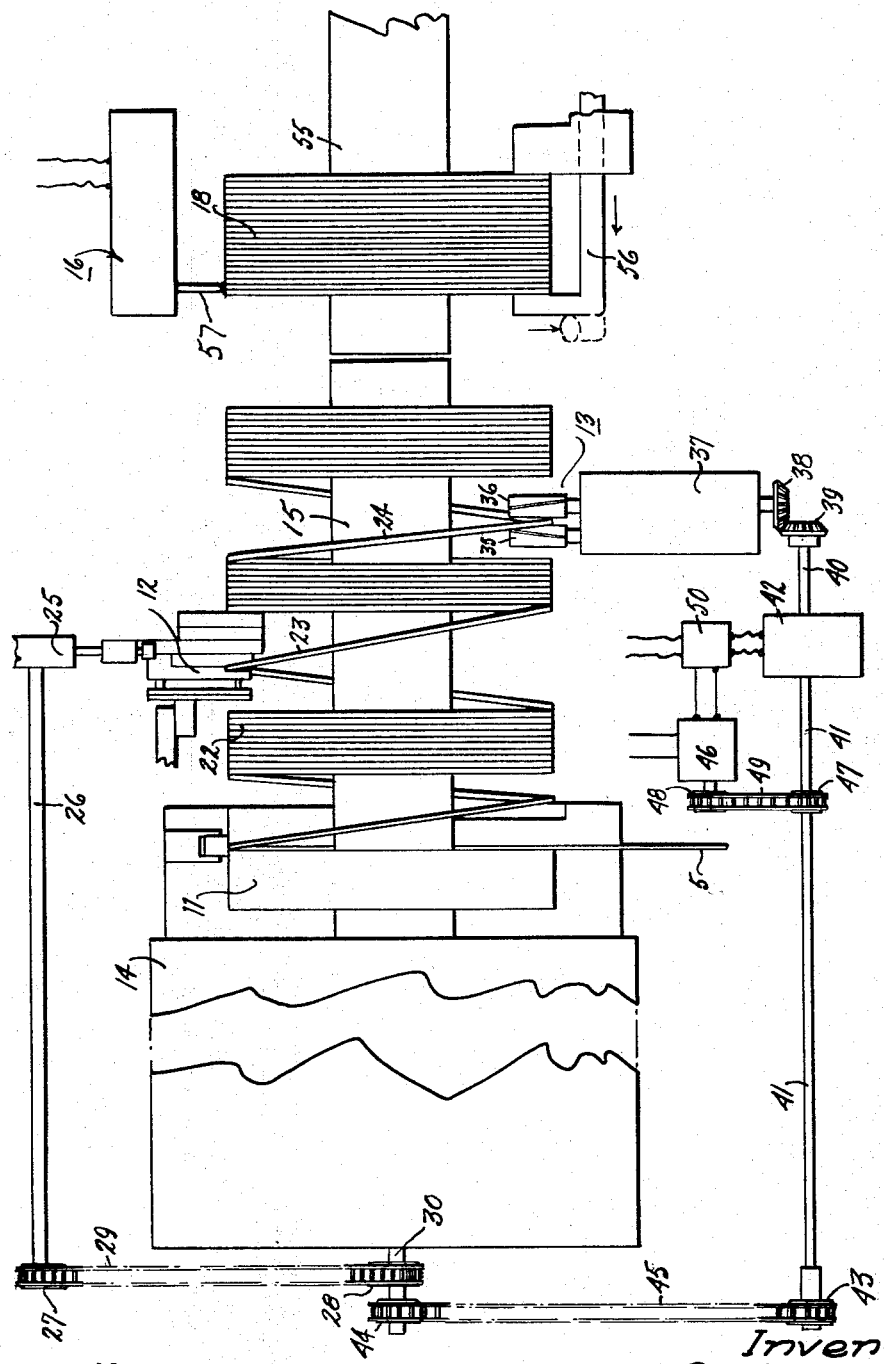

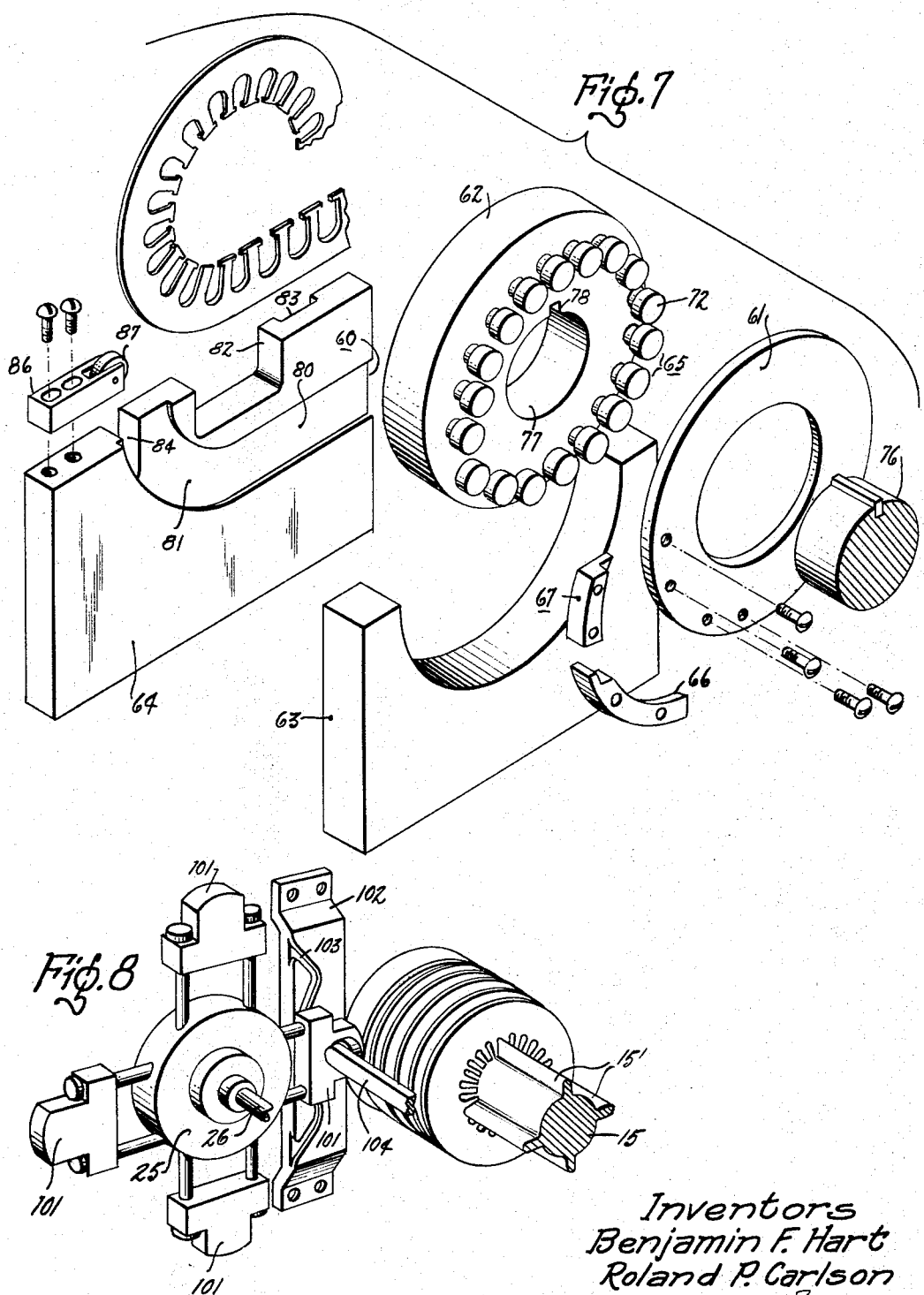

Nov. 8, 1966 B. F. HART ET AL 3,283,399
METHOD OF FORMING ELECTROMAGNETIC CORES
Filed March 11, 1964 6 Sheets-Sheet 5

Inventors
Benjamin F. Hart
Roland P. Carlson
by Paul A. Frank
Their Attorney

Nov. 8, 1966 B. F. HART ET AL 3,283,399
METHOD OF FORMING ELECTROMAGNETIC CORES
Filed March 11, 1964 6 Sheets-Sheet 6

Inventors
Benjamin F. Hart
Roland P. Carlson
by Paul A. Frank
Their Attorney

United States Patent Office 3,283,399
Patented Nov. 8, 1966

3,283,399
METHOD OF FORMING ELECTRO-
MAGNETIC CORES
Benjamin F. Hart, Ballston Lake, and Roland P. Carlson, Schenectady, N.Y., assignors to General Electric Company, a corporation of New York
Filed Mar. 11, 1964, Ser. No. 352,422
6 Claims. (Cl. 29—155.57)

This application is a continuation-in-part of our co-pending application Serial No. 858,198, filed December 8, 1959, and now abandoned.

This invention relates to a method for helically winding a continuous thin metal strip to form a laminated construction, and more particularly, to a method for helically winding a continuous thin metal strip to form a laminated electromagnetic core construction.

At the present time the most common method for fabricating laminated motor stators is to stamp discs from sheets of metal such as core iron or silicon steel. These discs are usually annular in shape with suitable notches or winding slots provided along the inner periphery thereof. The discs are suitably stacked and compressed to a desired height and some form of fastening means is utilized to connect the laminations into a single structure. The notches in the discs are suitably aligned so that electrical coils may be wound or placed therein. A fabrication process of this type entails a great amount of waste, especially of sheet material between adjacent disc stampings and in the center portion of each disc.

It has been previously suggested that such stator constructions be fabricated from a continuous strip of metal, the strip to be initially notched to provide the ultimate core construction with slots for the electrical windings. The strip is helically wound with the notches in the strip being in alignment to form an entire stator construction from a single strip of material. To further realize the advantages of winding the stator from strip material, it is further necessary to consider other steps required to fabricate an electric motor stator.

Usually, the stator is provided with a plurality of bolt holes passing axially through the stator structure for mounting purposes. Since the strip is greatly distorted during the winding operation, these holes must be placed in the strip after the winding operation has been completed. It has also been found that these holes must be made individually in the strip since drilling an entire bolt hole in the finished stator causes swaging of the strip material which will cause short circuiting of adjacent laminations of the stator, making the stator unsuitable for use.

In winding strip material, it is also necessary to cut the helically wound strip at predetermined intervals to form the individual stator constructions. Since for maximum efficiency and economy of manufacture the winding operation should be substantially continuous, it is highly desirable that these other operations also be carried out in a continuous fashion.

The chief object of the present invention is to provide an improved method for forming laminated structures by helically winding the structure from strip material.

Another object of the invention is to provide an improved method for forming electromagnetic core constructions by continuously winding and severing strip material to form individual core constructions.

A still further object of the invention is to provide an improved method for forming electric motor stator constructions by continuously helically winding strip material, piercing and severing the moving strip material to form individual laminated stator construction.

These and other objects of our invention will become more apparent from the following description.

In carrying out the objects of the present invention in one form, a method is provided for forming a laminated helically structure from an elongated strip of material having notches along one edge with the opposite edge having a generally regular configuration. This strip is initially driven edgewise through a confined arcuate path and formed into successive turns of generally rectangular cross-section such that both edges substantially circumscribe helices. As the formed turns continue to rotate, they are individually transferred either directly to a severing operation or first to a punching operation and then to the severing operation. In the punching operation, a tool is moved adjacent a predetermined point on the side of an individual turn and the turn is pierced, punched, or otherwise cut by the tool as the tool and turn travel together through an angular path. At predetermined intervals of time, as the turns continue to rotate, they are severed to form laminated stacks of more than one turn.

Thereafter, the individual turns of each stack are secured together, preferably under compression, at a fastening and aligning station while the notches are being aligned in an axial direction to form slots. In this way, helically wound laminated structures, for example stator cores, may be formed into a rigid construction by a process which lends itself to mass production manufacture.

The invention will be more clearly understood from the detailed description of a preferred embodiment described in the accompanying drawings.

In the drawing:

FIG. 1 is a diagrammatic view of an apparatus for practicing the present invention;

FIG. 2 is a detailed showing of a portion of notched strip material formed by the apparatus in FIG. 1;

FIG. 3 is a plan view of the portion of the apparatus shown in FIG. 1 wherein the winding, piercing, severing and fastening operations are illustrated;

FIG. 7 is an exploded perspective view of the apparatus shown in FIG. 4;

FIG. 8 is a perspective view of the piercing apparatus shown in FIG. 3;

Figure 4:
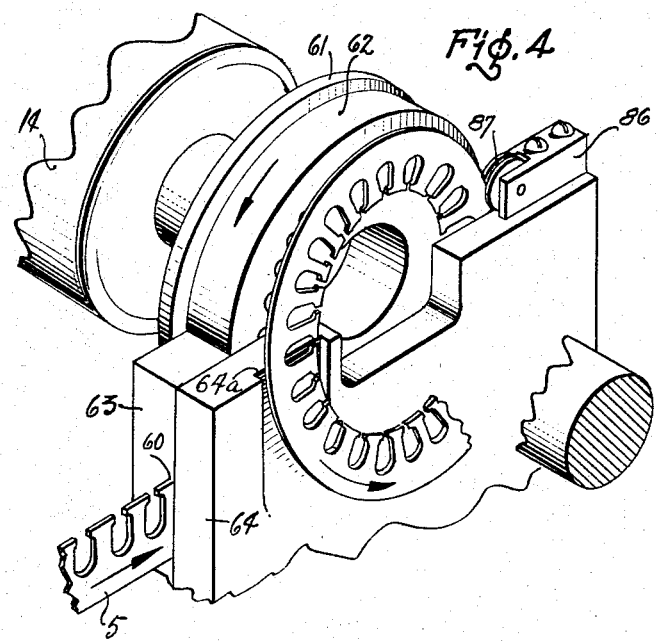
FIG. 4 is a perspective view of the winding portion of the apparatus shown in FIG. 3.

In FIG. 1, there is shown a diagrammatic view of an apparatus for practicing the present invention. A pedestal 2 having a suitable spindle has mounted thereon a spool or roll of strip material 3. This material may be a metal such as core iron or silicon steel. The spool is rotatably mounted to permit the removal of material in a continuous strip form. This strip may be passed through a suitable punch press 4 of well known construction having mounted therein a suitable die adapted to notch one edge of the strip material.

In FIG. 2, there is shown a fragmentary view of strip 5 after it has passed from punch press 4. The strip 5 has a regular or uninterrupted edge portion 7, a solid portion 6, and a plurality of teeth 8 having openings or notches 9 lying between the individual teeth.

Means may be provided to anneal the strip to soften the material. Adjacent punch press 4 may be located a suitable annealing oven 10 of a conventional type to perform this function. This oven may comprise a housing having located therein a suitable heat source (not illustrated) for bringing the temperature to the strip material to a desired level to suitably soften the material to permit further working thereof. The heating and cooling of the strip may be performed in an atmosphere of an inert gas to prevent the forming of an oxide coating on the strip.

It will be observed that in FIG. 1, by way of exemplification, the helical core forming apparatus, which may be conveniently utilized in the practice of one form of the present invention to be described hereinafter, is shown receiving the punched out elongated strips (FIG. 2) directly from annealing oven 10 after the strip has been annealed the desired amount. Obviously, under these conditions, the distance between winding portion 11 of the apparatus and oven 10 will dictate the need for supplemental equipment to support the notched strip intermediate these two operations. Conventional spaced apart rollers, accumulators, or the like may be utilized to compensate for any slight instantaneous difference in speed which might occur between the stamping action of the punch and the continuous winding operation of portion 11. For relatively short distances between these operations, any instantaneous difference, of course, would not require such supplemental equipment since the total linear variance in length of the trip between its minimum length (illustrated in FIG. 1) and its maximum length (not shown) would be extremely small and not interfere with the proper operation of the winding portion 11 of the apparatus.

Quite obviously, in actual practice the notched strip partially shown in FIG. 2 may be re-wound spirally on any suitable spool in the manner shown in FIG. 1 for the unnotched strip. For example, the type of spool illustrated in FIG. 1 or the conventional freely rotatable drum disclosed in the co-pending U.S. patent application Serial No. 163,608 of B. F. Hart, R. P. Carlson, and A. Zubal filed January 2, 1962, now Patent 3,206,964 and assigned to the assignee of the present invention could be used for this purpose. For reasons of versatility in manufacture and to permit the notched strip to cool before it is formed into a helix by winding portion 11, the notched strip could be re-wound on a spool either after it emerges from the punch operation or the annealing oven. In this regard, if the strip is notched and re-wound on a spool prior to the annealing step, then it is convenient to use a conveyor type arrangement for transporting the strip and spool through a suitable oven of standard construction during this step. In addition, it will be recognized by those skilled in the art that the total length of the coiled strip on spool 2 of FIG. 1 is determined by the number of cores and their axial length desired to be formed from the continuous strip in the subsequent operations.

Turning again to the discussion of FIG. 1, the strip is first passed through winding portion 11 of the forming apparatus of the present invention. After it has been formed edgewise into loose helical turns having the regular edge 7 circumscribing the notched edge, the turns are fed onto a splined arbor 15. In order to show clearly the related forming steps in FIG. 1, the splined arbor 15, accurately shown in FIGS. 8 and 10, has been reduced in cross-section with the splines 15' of FIGS. 8 and 10 having been removed for this purpose. However, it will be understood that splines 15' preferably extend the full length of arbor 15 from a point just beyond winding portion 11 of the apparatus to the free end of the arbor in the manner seen in FIGS. 8 and 10. Individual turns are then pierced by piercing apparatus 12, the strip continuing to move along splined arbor 15 until it encounters and passes severing apparatus 13 which upon predetermined amounts of material passing the cutting apparatus, severs the strip to form stacks 18 of a predetermined size. Stacks 18 are suitably compressed on the arbor by fastening apparatus 16 at which time the periphery of the stack may receive longitudinal welds or other fastening means to form the stack into a rigid structure. Fastening apparatus 16 may be mounted on a rotatable table 17 which passes stack 18 onto an inclined table 19. The stacks may then be passed into a suitable stress relieving oven 20 wherein the stresses in the strip material are relieved to improve the electrical characteristics of the metal and also to provide a suitable oxide insulating coating on the individual surface of the strip which is desirable to provide a suitable motor stator construction.

There is disclosed in FIG. 3 a plan view of the apparatus shown in FIG. 1, wherein strip 5 is helically wound, pierced and severed, followed by a stack fastening operation. The strip is initially fed to the winding apparatus 11, which is driven by a suitable drive 14. This winding apparatus will be more fully described hereinafter. After the strip is wound, it is mounted on splined arbor 15 to form the helical structure 22. Individual portions 23 of the strip are passed adjacent punching or piercing apparatus 12. The strip after being pierced is passed along the arbor 15, to permit a single portion 24 to pass between cutters 35 and 36 of severing apparatus 13.

Piercing apparatus 12 may include a punch carrier wheel 25 connected to a shaft 26 having located thereon a suitable sprocket 27 which is connected to sprocket 28 by means of a belt 29. Sprocket 28 is mounted on a shaft 30 which is connected to drive means 14. Assume for purposes of illustration that drive means 14 in FIGS. 1 and 3 conveys counter-clockwise rotary motion to arbor 15 and hence through splines 15' the same type rotary motion to the wound, loosely separated, helical turns. Through standard reverse gearing, a transmission or any other well-known mechanism included in drive means 14, shaft 30 is driven with a clockwise movement. This in turn imparts clockwise rotation to punch carrier wheel 25 through the intermediary shaft 26, sprockets 27, 28 and belt 29. Consequently, the helical turns on arbor 15 will rotate through a curved or predetermined arcuate path in the same direction (relative to arbor 15) as is imparted to cutting or piercing tool 101 radially movable on and carried by wheel 25. The manner in which tool 101 pierces the individual turns as the turns and the tool move concurrently through the same arcuate path for a preselected angular length will be brought out more fully hereinafter. Similarly, shaft 30 has mounted thereon a sprocket 44 which is connected to a sprocket 43 by means of a suitable belt 45. Sprocket 43 drives a shaft 41 which is operatively connected to cutter members 35 and 36. It will be appreciated that cutters 35 and 36 are intended only to operate at predetermined times when a suitable stack length has passed between the cutters.

In order to intermittently drive cutters 35 and 36 in response to this condition, the cutters are suitably mounted on shafts connected by suitable gears in the drive means 37. Drive means 37 has mounted thereon a suitable miter gear 38 which is driven by a miter gear 39 mounted on a shaft 40. Shaft 40 is connected by means of a magnetic clutch 42, to shaft 41. It is intended that the magnetic clutch 42 be engaged in response to a predetermined length or weight of material having passed cutters 35 and 36. In this particular embodiment, the amount of the strip has a functional relationship to the rotation of sprocket 47. Sprocket 47 is connected to sprocket 48 by means of belt 49. Sprocket 48 is mounted on counter 46 which is adapted to sense a predetermined number of rotations of sprocket 48 at which time a switch is actuated to supply current to relay 50. When relay 50 is so actuated, it remains in the energized position for a predetermined length of time during which the magnetic clutch is engaged. This interval is predetermined so that the driving relationship to cutters 35 and 36 results in a single revolution of the cutters. The stack of strip so severed is passed onto arbor 55 of fastening apparatus 16.

Fastening apparatus 16 may include a suitable clamp 56, which may be hydraulically actuated to compress the stack 18. While being compressed, suitable fastening means 57 such as a welding apparatus may connect the peripheral portions of the stack 18 at spaced points to form a rigid structure. In this particular embodiment it is envisioned that a weld be made in an atmosphere of inert gas, forming beads running axially along the length of stack 18.

FIGS. 4, 5, 6, and 7 disclose in detail a winding apparatus which may be utilized in the present invention. Notched strip 5 in FIG. 4, is supplied either as shown in FIG. 1 or in coiled form from a spool or drum to a slot 60 partially formed by backup plate 63 and winding shoe 64 which may be bolted to each other (not illustrated). The strip is supplied so that it lies substantially parallel to the axial face of rotatable member 62. Suitable pins may be mounted within rotatable member 62 to engage strip 5 at spaced points and urge or drive the strip into a confined arcuate path and along with the other components of winding portion 11, form the strip edgewise with a helix in which the turns each have a generally rectangular cross-section. These pins may be reciprocally mounted in rotatable member 62 and their motion governed by the cam plate 61, in a manner to be more fully described hereinafter.

Figure 5:
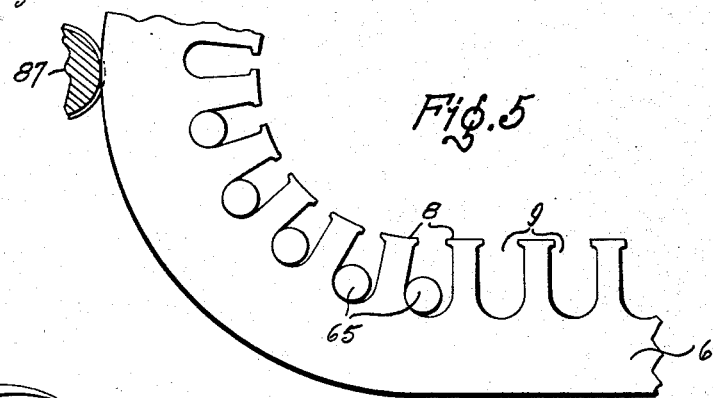
FIG. 5 is a fragmentary view of the strip during the winding operation.
Figure 6:
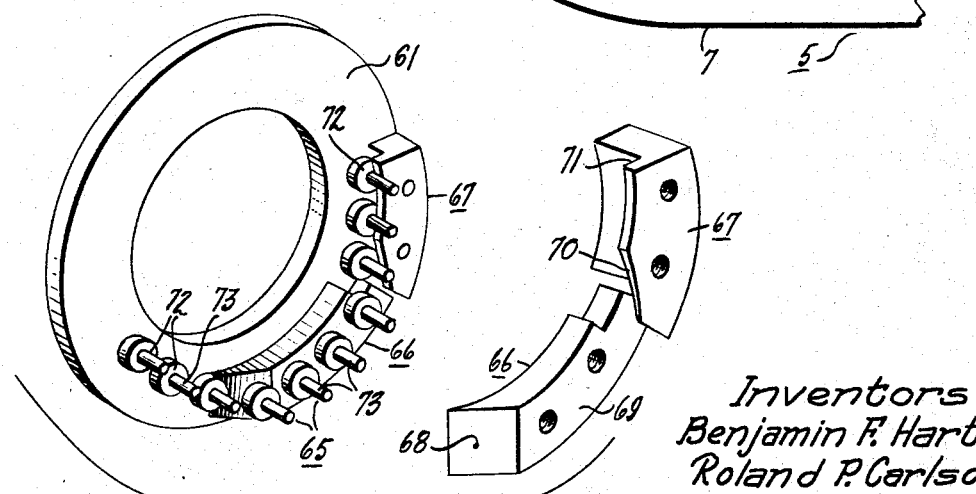
FIG. 6 is a fragmentary perspective view of the pin moving means utilized in the apparatus in FIG. 4 with an enlarged perspective view of the cam utilized for moving the pins.

Referring to FIGS. 5 and 6, during the winding operation suitable pins 65 engage the notches in strip 5, and this engagement takes place for angular distance less than 180°, such as in the neighborhood of 45° as illustrated. During this time the material is suitably compressed while the strip is urged along the arcuate path of the pins. In order to cause the pins 65 to engage the strip and to move the strip in this path, a suitable cam structure is provided. In FIG. 6, there is shown the cam plate 61 upon which is mounted the cam members 66 and 67. The pins 65 each comprise a head portion 72 and a shank portion 73. As previously mentioned, the pins 65 may be mounted within a plurality of annularly disposed holes in the rotatable member 62 in a manner to permit reciprocal movement therein. When the pins are fully urged into the rotatable member 62 so that the head portion is substantially adjacent the rotatable member, the end of the shank portion protrudes from the opposite side of rotatable member 62 to engage a portion of the strip 5 in the area of the walls of the notches 9 which are separated by the individual teeth 8, as shown in FIG. 5.

In this position, the select group of pins which are intended to extend from the rotatable member 62, engage the walls of the notches and since the rotatable member is driven by drive means 14, shown in FIGS. 1 and 3, it carries therewith the strip member in an arcuate path. After a predetermined time, the shape of the notches 9 will change in character because of the arcuate shape being given to the strip material. This occurs approximately after the pins have been in engagement for 45°. At this time the opposite edge of the notch tends to engage the pin 65, and it is necessary to withdraw the pin. It will be noted in FIG. 5, that to control the outer diameter of the strip material, a suitable roller 87, mounted on a movable block 86 engages the outer periphery 7 of strip 5 to control the shape of the edge. It is the function of the roller to impart a final set to the strip whereby upon release of the bias the strip will have a desired arcuate shape.

Means may be provided to give the pins 65 the desired reciprocal motion in the form of cam members 66 and 67. The head portion 72 of the pins engage the beveled edge 68 of the cam member 66. This causes pin shank portion 73 to extend from rotatable member 62. After the pin is fully extended, the head portion 72 engages planar surface 69 of cam member 66 which maintains the pin in this position. In this position the pin has penetrated the strip as shown in FIG. 5. The pin is permitted to remain in this position for approximately 45° until it engages beveled surface 70 of cam member 67. This surface 70 engages the shoulder of head portion 72 adjacent shank portion 73 and withdraws the pin from strip 5. When the pin is fully retracted it engages surface 71 which assures that the pin is in a fully retracted position. Upon a complete revolution the pin again engages beveled surface 68 of cam member 66. By this means the pins consecutively receive a reciprocating movement to achieve winding of the strip in an arcuate shape.

In winding a strip in a manner wherein one edge is adjacent the axis of the helix about which the strip is wound, that is, the strip is wound as to substantially lie in planes normal to the axis of the helix, it is necessary to support the strip during the winding operation to prevent buckling of the strip. This is achieved by the action of winding shoe 64, backup plate 63 and rotatable member 62. FIG. 7 is an exploded view of the apparatus shown in FIG. 4. Driving arbor portion 76 of arbor 15 is connected to the drive means 14 shown in FIG. 3. This arbor portion is adapted to pass through the opening in cam plate 61 which is a flat, annular member to which cam members 66 and 67 are bolted. This driving arbor further passes through an opening defined by the surface 77 in rotatable member 62. Surface 77 may be provided with a suitable keyway 78 which permits a driving connection between driving arbor portion 76 of arbor 15 and rotatable member 62. Rotatable member 62 is a member of substantial width and has annularly disposed therein a plurality of holes adapted to have the pins 65 mounted for reciprocating motion therein. The shank portions of these pins 65 are of a length such that when the head portion 72 is substantially adjacent the rotatable member, a portion of the pin extends from the opposite side into the slot 60 which is defined by the rotatable member 62, backup plate 63, and winding shoe 64.

Slot 60 is defined by a recess in the winding shoe. This slot has a straight portion 80 and an arcuate portion 81. Pins 65 are adapted to extend into the arcuate portion 81 of the slot. It can be seen by this view that during the winding operation the face of rotatable member 62 and members 63 and 64 provide a support for the strip member while it is being bent into the arcuate shape.

In winding a strip in the manner shown in FIG. 4, the strip is subject to substantial stresses of such a nature that the metal along the inner portion of the arcuate strip is in compression. However, since the strip is suitably notched these stresses are greatly relieved. Along the outer periphery adjacent edge 7, the material is subjected to great tensile stresses which tend to cause a decrease in the thickness of the material. It will be appreciated that in winding a structure with the outer periphery so stretched and thinned by the stresses, that a strip of uneven thickness may result. In order to achieve uniform thickness during the winding operation it is desirable that the strip not only be supported but also that the strip be compressed to cause a flow of material.

In a typical operation to form a stator construction having a diameter of approximately 5 inches and a length of between 1 and 3 inches, strip material having a width of 1¼ inches is supplied with a thickness of approximately .025 inch. In order to compress the material, slot 60 has a width of .023 inch. Naturally, for the purposes of facilitating the feeding of strip into the slot, it may be desired to taper the slot at the entrance thereof to a greater width. During the winding operation when the material is being bent about the axis of arbor portion 76, because of these compressive stresses, the material adjacent the base of teeth 8 of the strip which is substantially in a compressive state, due to the bending, also has stresses acting along the faces of the material which cause the material to flow radially outwardly toward edge 7. This provides an arcuate strip of substantially uniform thickness. If desired, during the winding operation a lubricant may be utilized to cool the material, lubricate the surfaces of the strip and flush away particles such as annealing scale.

FIG. 7 further discloses winding shoe 64 having indented portion 83 which provides clearance for the helically wound strip after it has passed 270° around the axis of the helix to clear the winding shoe. Indented portion 82 provides clearance for arbor 15 (FIG. 3). A further indented portion 84 is provided to permit the operation of the diameter controlling device. This device comprises block 86 having rotatably mounted thereon roller 87 which engages the outer periphery of the strip as it emerges from the winding show. The position of block 86 may be adjusted to provide a desired bias on the strip. By means of this bias the amount of set in the strip is fixed so that upon release of the bias the strip will assume a desired arc. It should be noted at this time that winding shoe 64 contains a recess 64a (FIG. 4) in the path of travel of the wound turn, angularly beyond roller 87 which serves as a guide to assist in the advancement of the turn as it emerges from the winding operation, onto splined arbor 15. This winding apparatus is more fully disclosed in our co-pending application entitled, "Method and Apparatus for Helically Winding Strip Material," Serial No. 858,199, filed December 8, 1959, now Patent 3,062,267.

Figure 9:
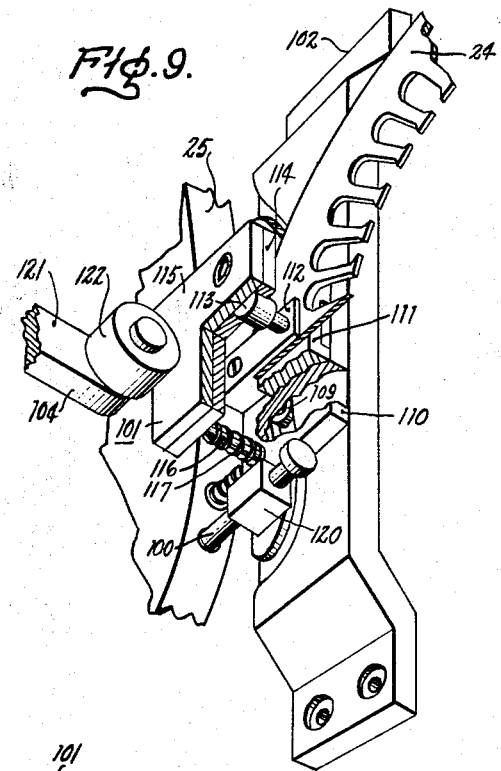
FIG. 9 is an enlarged fragmentary perspective view showing a punch carrier with its relationship to the strip as shown in FIG. 8.
Figure 10:
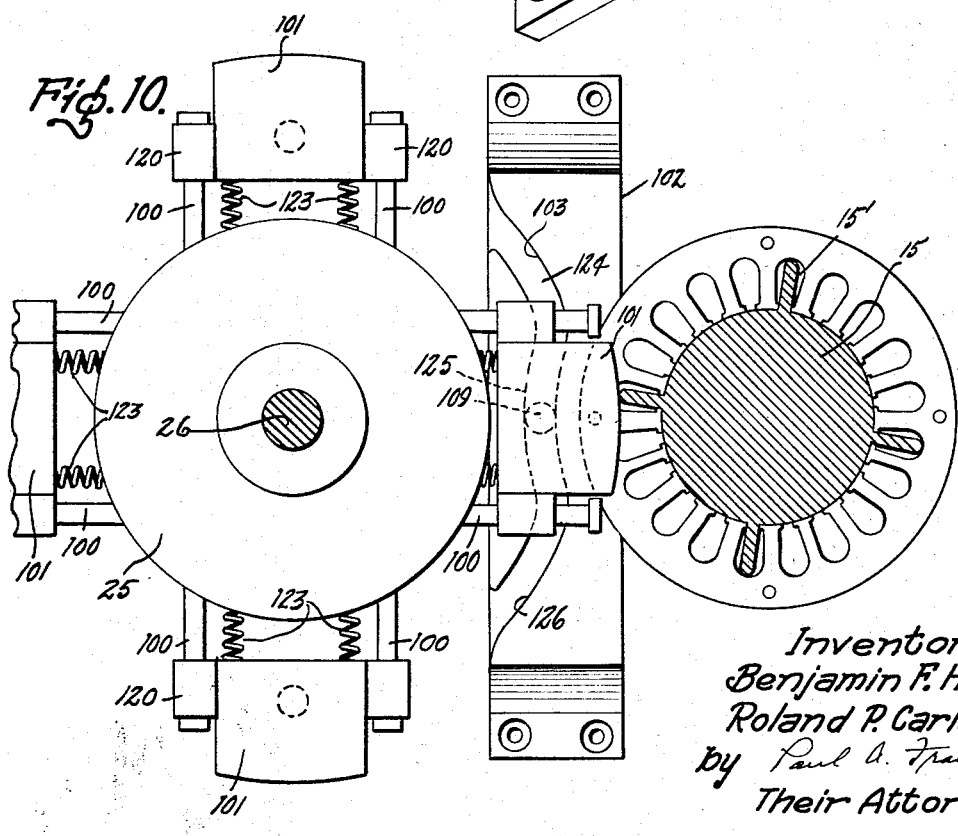
FIG. 10 is a fragmentary view taken in a plane normal to the arbor axis of the apparatus shown in FIG. 3, showing the relationship between the punch carrier wheel and the strip.

In order to realize the advantages of winding stator constructions from continuous strips of metal, it is also necessary to provide mounting bolt holes in the stator construction in a manner wherein the continuous movement or winding of strip on rotating arbor 15 (FIG. 3) is not interrupted. The strip turns preferably are individually pierced without interrupting the rotational movement of the helically wound strip on the arbor. FIGS. 8, 9, and 10 are directed to means for individually forming these holes while the turns are in motion on arbor 15 after they have been helically wound. FIG. 8 is a perspective view of the apparatus wherein arbor 15 with its splines 15' engage the notched portions formed in strip 5 so as to align these notches. Punch carrier wheel 25 is rotatably connected to drive means 14 shown in FIGURE 3, whereby a relationship is determined between the rotational speed of arbor 15 and the rotational speed of the punch carrier wheel which will be more fully described hereinafter.

Punch carrier wheel 25 has mounted thereon at 90° intervals, punch carriers 101 which are reciprocally mounted on the radially extending guide bars 100, each punch carrier being mounted on two guide bars. Punch carriers 101 having defined therein suitable spaces within which an arcuate portion of the strip extends. While the punch carrier has its punch moving at substantially the same speed and in substantially the same direction as the strip along a predetermined arcuate path, the punch carrier is actuated so that a predetermined point on the strip is pierced while the strip and the punch are moving concurrently in the same arc at the same speed.

The means for guiding the punch carrier in a predetermined arcuate path includes a cam 102 which is provided with a surface 103. It will be noted that punch carrier 101 is capable of sliding on guide rod 100 under the influence of the cam. At the point that the strip is intended to be punched, the cam plate on the punch carrier engages the cam follower 104, causing the strip to be pierced.

In FIG. 9 there is shown an enlarged fragmentary perspective view of the punch carrier while it is piercing a strip. Punch carrier 101 includes a backup plate 110 having suitable bearing block portions 120 which are in sliding engagement with the guide rods 100, thereby permitting the plate to move in a radial manner on the guide rods while the punch carrier is rotating. Adjacent backup plate 110 and attached thereto is die 111 and also bolted thereto is support member 112. Both die 111 and support member 112 have a suitable hole therein to permit punch 113 to pass therethrough so that the punch may pass into the space provided between support member 112 and die 111 to pierce strip 24.

In order to actuate punch 113, a punch plate 114 is provided which is capable of reciprocal movement with respect to members 111 and 112. This punch carrier plate has extending therefrom punch 113, and on the other side thereof, there is mounted cam plate 115. To permit reciprocal movement of the punch plate, rods 116 are provided having mounted thereabout springs 117. These rods guide the reciprocal motion of the punch and springs 117 cause punch plate 114 and cam plate 115 to return to their retracted position after a punching operation has been completed. In order to actuate this punch mechanism, a cam follower 104 is provided which comprises a stationary bar member 121 having mounted thereon roller 122.

It can be seen that as punch carrier wheel 25 rotates, cam plate 115 of punch carrier 101 engages roller 122 and because of the inclined surface of the cam plate, the punch will pass through the suitable openings provided in die 111 and support member 112, permitting the punch to enter the space therebetween to pierce the strip. After this operation is completed spring 117 causes the reciprocally mounted punch plate assembly to return to its retracted position. As previously noted, it is intended that the punch pierce holes at predetermined points on the strip so that when the strip is stacked into a stator construction, all the openings therein will be in alignment to permit bolts to be passed therethrough for mounting purposes. It is therefore desirable that these bolt holes be in alignment. To achieve this, a positive connection between strip 5 and arbor 15 is required, such as splines 15'. Because of the chain and sprocket drive shown in FIG. 3, there is a speed relationship between arbor 15 and the rotational speed of punch carrier wheel 25. This arrangement controls the intervals at which the holes are placed and assures alignment.

It is also intended that these holes be punched without impeding the rotation of the strip on the arbor. To do this, the punch approaches a predetermined point on the strip, this predetermined point being the point which is intended to be pierced. The punch then travels in substantially the same arcuate path as the predetermined point and also at the same speed. While this speed and path relationship is maintained, the punch plate with its cam engages the cam follower causing the punch to pierce the predetermined point on the strip.

There is shown in FIG. 10 a fragmentary view illustrating the means for maintaining the space relation between the punch and the strip when the strip is being pierced. The punch carriers 101 are biased in their outermost position on guides 100 by means of springs 123. From FIG. 9, it is noted that the roller 109 is mounted on the stationary member 110 and this roller by its coaction with the cam surface 103, can overcome the bias of the springs so as to determine the distance relationship between the axis of the punch carrier wheel axis and the punch. Cam surface 103 is divided into three arcuate portions 124, 125, and 126. As the punch carrier wheel rotates in a clockwise direction, the punch carrier with its roller 109 rotates in a counterclockwise direction and engages the surface 124 which has center coaxial with the center of rotation of the punch carrier wheel. This permits the punch to approach the arc which will be scribed by a predetermined point on strip 5. When the punch intersects this arc, roller 109 passes into the portion 125 of cam surface 103 which is also arcuate, however, surface 125 has its center coaxial with arbor axis 15. At this point punch 113 will travel in substantially the same arc as a predetermined point on the strip. Approaching the mid portion of surface 125, punch carrier 101 engages cam follower 104. Roller 122 engages cam plate 115 which causes the punch to advance toward the predetermined point on the strip and pierce the strip at this point. After the punch carrier passes the cam follower, spring 117 on the punch carrier caused the punch to withdraw and punch carrier roller 109 engages surface 126 of cam surface 103. By this construction, strip 5 is pierced at a predetermined point and the succession of such points are determined so that upon stacking strip 5 holes will pass through the entire stack. This construction is more fully described in the co-pending application of Benjamin F. Hart entitled, "Method and Apparatus for Perforating a Helically Strip Wound Edgewise," Serial No. 285,170, filed May 2, 1963 (now Patent No. 3,211,032) which in turn is a continuation application of Serial No. 858,197, filed December 8, 1959, now abandoned.

Since the spool of material 3, shown in FIG. 1 is capable of containing material for a large number of stacks 18, it is desirable to sever the wound material on arbor 15, so that stacks 18 having a predetermined amount of material are formed. FIG. 3 disclosed an apparatus which senses the intervals at which the continuously rotated strip on arbor 15 should be severed and provides actuating means which severs the strip, utilizing cutters 35 and 36. Strip 24 passes between these cutters which sever the strip without the rotational movement of the strip being impeded in any manner.

Figure 12:
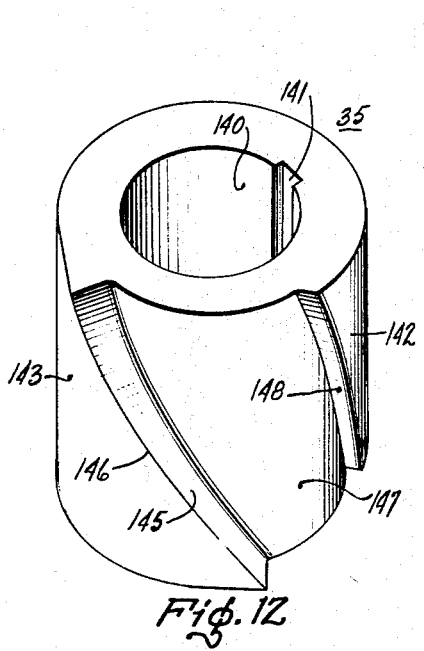
FIG. 12 is an enlarged perspective view of a cutter member.
Figure 13:
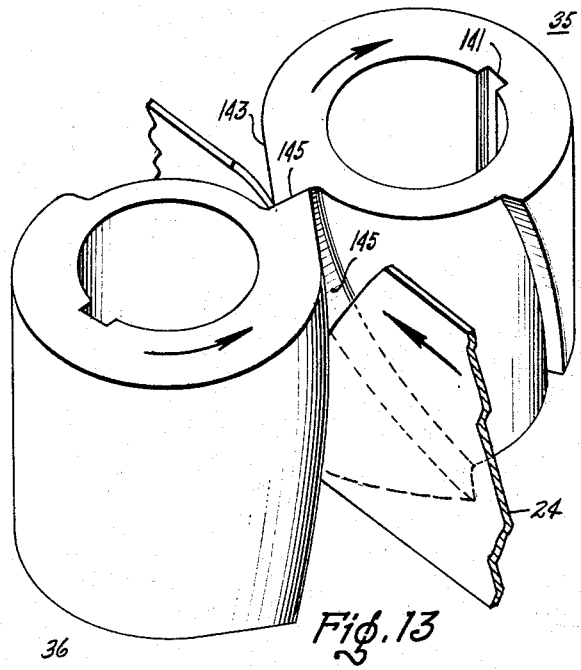
FIG. 13 is a perspective view of the cutter members severing a strip.
Figure 11:
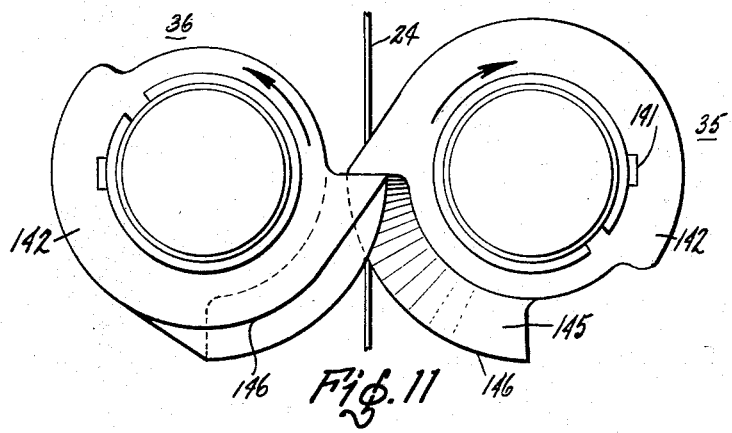
FIG. 11 shows a plan view of the cutter members shown in FIG. 3.

FIGS. 11, 12, and 13 disclose a preferred embodiment of cutters 35 and 36 to be utilized to perform this continuous servering function. FIG. 11 discloses strip 24 passing between the cutters which are provided with two overlapping shearing portions. FIG. 12 is a perspective view of a typical cutter. Each cutter has a generally cylindrical shape with a cylindrical opening 140 having a suitable keyway 141 located therein. This construction permits the cutter to be mounted on a shaft and the keyway permits a driving connection between the shaft and the cutter. The outer periphery of the cylindrical member partially comprises an arcuate portion 142. The distance from the center of the cutter to surface 142 is less than half the distance between the axes of cutters 35 and 36 when mounted on parallel shafts thereby providing a clearance between the cutters. Arcuate portion 142 extends about the cutter to a land portion 143 which also has a substantially arcuate shape. Surface 143 is at a greater distance from the axis of the cutter than surface 142. This can be seen in FIG. 11 where the land portions appear to overlap the path of the strip of material 24 passing between the individual cutters. The land portion of each cutter terminates at a cutting edge 146, which is substantially defined by the intersection of the land surface and a helical surface 145. In order to provide clearance for the cutting edge 146, the cutter has a recessed portion 147. The opposite extremity of recess 147 is bounded by surface 148 which also defines the edge of arcuate portion 142.

In operation, cutter members 35 and 36 rotate in opposite directions. For this reason, cutting edges 146 of each cutter, although having substantially the same helical shape, have opposite slopes. Because of this construction, as cutter members 35 and 36 rotate, the upper edges of the cutting portions of each cutter are first to contact or lie adjacent one another and as the cutter members continue to rotate, there is a tendency for the cutting portion of the cutting edge to pass across the path of strip 24. Since the upper portion of each cutting edge of each cutting member is adjacent the other, there is created a shearing action. As the cutters continue to rotate, progressive portions of the cutting edges of each cutter pass adjacent one another. It can be seen by this action that a shearing edge passes from the upper portion of the strip to the other edge of the strip terminating in the final severing of the strip.

Because of the particular helical configuration of cutting edges 146, and also because of the relationship between the speed of the strip material and the cutter members there is created a relationship whereby the cutting portion of cutting edge 146 not only moves across the strip to sever it, but also the cutting portion of the edge moves substantially in the same direction and substantially the same speed as the strip at the immediate point of shear. The construction of these cutters is more fully described in the co-pending U.S. application of Benjamin F. Hart entitled, "Method and Apparatus for Severing a Moving Helical Strip," Serial No. 858,200, filed December 8, 1959, now Patent 3,095,774.

Considering the operation of the present invention, a spool of metal strip such as core iron or silicon steel is placed on pedestal 2. The end of the strip is fed into punch press 4 which as previously noted, is provided with a suitable die to notch the edges in the form shown in FIG. 2. After the material is notched, it is fed into annealing oven 10, wherein the temperature of the metal is increased to suitably anneal and soften the material. This annealing is performed in an atmosphere of inert gas to prevent an oxide coating of any magnitude forming on the surface of the strip. The material in this condition is passed to winding apparatus 11. It can be seen in FIG. 3 that strip 5 is passed to the winding apparatus substantially with its planar surfaces normal to the rotational axis of arbor 15.

Referring to FIGS 4, 5, 6, and 7, strip 5 is passed into slot 60 in a manner so that the notched edge of strip 5 is the portiton closest to the rotational axis of rotatable member 62. Strip 5 first passes through the straight portion 80 of slot 60 which initially is tapered to permit easy entrance of the strip. When the strip reaches arcuate portion 81, pins 65 are encountered. The lower most pin 65 on rotatable member 62 engages beveled surface 68 (FIG. 6) of cam member 66. This causes shank portion 73 of the pin to extend from rotatable member 62 into slot 60 and to penetrate strip 5 so as to enter notch 9 between teeth 8. As the rotatable member rotates, pin 65 engages the wall of notch 9. As the lower most pin 65 continues in the arcuate path defined by the rotational movement of rotatable member 62, head portion 72 of pin 65 engages surface 69 of cam 66 which maintains the pin extending into arcuate portion 81 of slot 60. As the rotatable member 62 continues to rotate, successive pins 65 pass into notches 9, to engage the edges of the adjacent teeth 8.

As the strip passes into this arcuate path there is a tendency for the strip material to buckle. However, since the material is restrained between the surface of winding shoe 64 and the adjacent surface of rotatable member 62, this is not possible. There results a tendency for the outer fibers of the strip to be placed into tension and the inner fibers to be placed into compression. Normally, the teeth of the strip come into closer proximity with respect to one another and this is accompanied by a decrease in the material thickness in peripheral portion 7 of the strip.

As previously mentioned, it is desirable to maintain the thickness of the strip substantially uniform. To achieve this in the present invention, compressive forces act on the surfaces of the strip, causing the material in the strip to flow in a radial direction toward the peripheral edge 7 of the strip. This is achieved by passing a strip into slot 60 which is of a greater width than the slot. It has been found that during the winding operation, this compression causes material in the area of the base of teeth 8, to flow radially outwardly and there is a displacement of material from this area toward edge 7. By this means, the thickness of the strip is maintained substantially uniform.

In FIG. 5, it will be noted that the size of the initial notch 9 is diminished both in width and in shape during the winding operation. Initially, there is ample room for pin 65 to fit into the slot. However, after rotating of approximately 45°, it can be seen that this space becomes more and more restricted and there is also a tendency of the opposite edge of the notch to engage the pin.

After the pin has engaged the strip for approximately 45°, head portion 72 of the pin engages beveled surface 70 which retracts the pin out of engagement with the wall of slot 9. After the pin is fully retracted, head 72 of pin 65 engages surface 71 which assures that the pin is in retracted position until the revolution made by the pin is completed and it again engages the beveled surface 68 of the cam member 66. To maintain the diameter of the strip to a desired dimension the roller 87 (FIG. 7) engages the strip to bias the strip whereby a desired arc is maintained on the strip after the bias is removed. After the strip has emerged from slot 60 and passed the diameter controlling means 85, it moves about arbor 15. In order to align the strip on the arbor, the arbor is provided with suitable splines 15' which are adapted to extend into spaced notches in the strip and thereby index the strip and form means for providing a driving connection between arbor 15 and rotating helical strip 5. Because of the driving connection (FIG. 3) between punch carrier wheel 25 with drive mechanism 14, and the connection between drive mechanism 14 and arbor 15, a predetermined speed relationship between the rotation of the punch carrier wheel and the arbor is maintained.

Referring to FIGS. 8, 9, and 10 strip 5 is advanced until a single arcuate portion 23 lies adjacent punch carrier wheel 25. The punch carriers are biased at their outermost position and as a particular punch carrier approaches cam 102, strip portion 24 passes into the space between die 111 and support member 112 of the punch carrier. If desired, suitable means (not illustrated) may be provided to maintain the arcuate portion of the strip in proper space relation with respect to the punch carriers. Simultaneously, the punch carrier passes under the influence of cam surface 103. Initially, the cam follower roller 109 associated with the punch carrier engages portion 124 which guides the punch carrier until it reaches a predetermined arc about the axis of arbor 15 in which lie predetermined points which are to be pierced on strip 5. When punch 113 reaches this particular arc, the punch carrier comes under the influence of arcuate portion 125 of cam surface 103; this arcuate cam surface has its center about the arbor axis. At this point the punch carrier moves radially inwardly in response to surface 125 and the punch lays adjacent to, travels at the same speed and also along the same arcuate path as the predetermined point on the strip. Substantially, midway along this surface 125, cam member 115 of the punch carrier engages cam follower roller 122 so as to urge the punch block forward so that the punch extends into the space between die 111 and support member 112. The punch pierces the strip at the predetermined point on the strip. After the punch carrier passes cam follower 104, springs 117 retract the punch and punch carrier roller 109 passes into portion 126 of cam surface 103 which has its center about the punch carrier wheel axis.

By this means a plurality of individual holes have been placed in strip 5 in such a manner that they lay at predetermined points which upon stacking of the strip, causes the holes to be in alignment so that mounting bolts may be passed therethrough after the construction is completed. It will also be appreciated that the number of punch carriers may be increased to any desired number, depending upon the number of mounting holes desired in the stator construction.

Referring to FIG. 3, after strip material 5 has been pierced, it continues to rotate about the arbor axis until a single arcuate portion 24 passes between cutters 35 and 36. At predetermined intervals, counter 46 determines that sufficient material for a single stator has passed cutters 35 and 36 and the counter actuates a switch which energizes relay 50. Relay 50 receives a pulse of energy which maintains the relay closed for a predetermined amount of time during which time current is permitted to pass to magnetic clutch 42, creating a drive connection from driving means 14 to miter gears 38 and 39, which causes cutters 35 and 36 to make a complete revolution.

As previously mentioned, arbor 15 is continuously rotating and as cutters 35 and 36 rotate, the upper portions of cutting edges 146, as shown in FIGS. 11 and 13, pass adjacent one another. As cutting edges 146 pass one another, the edges 146 of each cutter overlap the other and shear the strip located therebetween. This operation is performed so that the cutting portions of edges 146 during the rotation of the cutters not only move across the strip to sever the strip, but simultaneously because of the angle of cutting edges 146 and the rotational speed of the cutters, the cutting portion of each cutting edge 146 also moves substantially in the same direction as the moving strip 24 and also substantially at the same speed.

After the turns 5 have been suitably severed, the helix is passed in any suitable way, either by an automatic operation or by hand, from rotating arbor 15 to a stationary arbor 55 (FIGS. 1 and 3) where the strip turns which now comprise a helically wound stack 18, is suitably compressed by any clamp 56 of well-known construction and fastening means is provided, such as a weld along the periphery of the stack to create a rigid stack. Arbor 55 preferably is of the same diameter as arbor 15 and includes similar splines to those of arbor 15, the splines extending the axial length of arbor 55 in the region radially within the axial confines of clamp 56 to maintain the notches in alignment during the securing operation. However, in order to show details of the helical stack in FIGS. 1 and 3, the illustrated arbor 55 is of reduced diameter and shown without its splines. To weld the periphery of the stack, the welding apparatus may be mounted on a suitable rotatable table 17 and may be axially movable relative to clamp 56. Table 17 may rotate and the rigid stack 18 is placed on inclined table 19 which feeds the stacks so fabricated into a stress relieving oven 20 wherein the grain structure of the material is relieved to wherein the grain structure of the material is relieved to enhance the electrical qualities of the material while simultaneously placing an oxide coating on the strip material in such a manner as to insulate adjacent windings of the strip.

The present invention has disclosed a method for forming electromagnetic core constructions by continuously removing the strip material from a spool, passing it through a suitable punch press to notch the strip, passing the trip through an annealing furnace and then continuously winding the strip with the notches forming the inner periphery of the stack which is the electromagnetic construction. The strip so wound is continuously rotated and continuously pierced to form mounting bolt holes in the strip. The strip is continuously passed between cutters which intermittently sever the strip without impeding the motion of the strip. The strip so wound, pierced and severed, is then fastened into a rigid unitary structure having the pierced holes and the notches forming the inner periphery of the electromagnetic core construction in alignment. The construction is passed into a stress relieving oven which relieves the stresses in the strip and simultaneously places an oxide coating on the strip, making the stator construction ready to receive suitable electrical windings to complete the fabrication of the electromagnetic device.

Where there has been described a preferred embodiment of the present invention, it will be appreciated that the invention is not limited thereto but that various modifications may be made without departing from the scope of the appended claims.

What we claim as new and desire to secure by Letters Patent of the United States is:

1. In a method of forming a helically wound laminated structure the steps which include: helically winding a strip edgewise about a first axis into a number of successive helical turns each formed with a generally rectangular cross section at any given location across the turn and with a notched edge and an uninterrupted edge whereby the uninterrupted edge substantially defines a helix which circumscribes the helix substantially defined by the notched edge, guiding and advancing the individual turns onto a rotating arbor having an axis substantially coaxial with the first axis, piercing holes in the individual turns at spaced intervals as the turns rotate with the arbor, and severing a single turn of the rotating turns after a predetermined number of turns have been pierced to form a laminated stack.

2. The method according to claim 1 further comprising the steps of aligning the notches and pierced holes to form a number of passageways axially through the stack and axially compressing the helically wound turns of the severed stack, and firmly securing the turns of the stack together as the notches and pierced holes in the stack are held in alignment.

3. In a method of forming a helically wound laminated core from a strip of magnetic material having a succession of openings therein, the steps which comprise: successively engaging the walls of the strip defining the openings and driving the strip edgewise through a confined arcuate path, compressing the strip axially as it passes through the confined arcuate path to maintain the thickness of the strip substantially uniform and forming successive helical turns, advancing the turns from the confined arcuate path onto a rotating arbor, moving a punching tool adjacent a predetermined point on the respective sides of an individual turn as it is rotatably driven through a curved path by the arbor, passing the punching tool and the individual turn concurrently through said curved path at the same speed and in the same direction while punching the turn at the predetermined point by operation of the tool during such concurrent travel, and moving the tool away from the predetermined point after the turn has been punched.

4. In a method of forming a laminated helically wound structure from an elongated strip of material the steps which include: driving the strip edgewise through a confined arcuate path and forming the strip into successive turns of generally rectangular cross section at any given location across the turn and having a notched edge and a regular edge whereby the regular edge substantially defines a helix which circumscribes the helix substantially defined by the notched edge, transferring the turns from the confined arcuate path individually to a severing means as the turns are being rotated edgewise, severing the turns at predetermined intervals as the turns continue to rotate to form stacks of more than one turn, transferring the stacks to a fastening and aligning station, and fastening the individual turns of each stack together into a substantially rigid helically wound structure while aligning the notches in an axial direction at said station.

5. In a method for forming a helically wound laminated structure the steps which include: winding a helix having loosely separated successive turns of generally rectangular cross section at any given location across an individual turn onto a rotating arbor rotating the helix and arbor together as a unit with the arbor driving the turns individually about an axis and successively through an arcuate path, rotating at least one punching tool about an axis, moving the tool adjacent a predetermined point on the sides of an individual turn as it rotates through said path, punching the turn at the predetermined point by the tool as the turn and tool travel together through said path, angularly driving the punched turn axially beyond the arcuate path and individually between two separated cutting edges, moving the edges into severing engagement with the turn and transversely severing an individual turn after a preselected number of turns having been driven between the cutting edges thereby forming a helically wound structure of more than one turn.

6. In a method of forming a helically wound, laminated structure, the steps which comprise: notching one edge of a continuous thin metal strip having a generally rectangular cross section, annealing the notched strip, helically winding the notched strip edgewise into successive helical turns, feeding the formed turns onto a rotating arbor and aligning the notches of the individual helically wound turns on the rotating arbor, piercing holes individually through the sides of successive turns at preselected locations as the turns are rotated, severing the turns at predetermined intervals greater than one turn to form at least one stack of helically wound turns having a preselected axial length, compressing the severed stack, fastening the turns of the stack together as the turns are maintained under compression to form a rigid laminated structure, and stress relieving the laminated structure so formed.

References Cited by the Examiner
UNITED STATES PATENTS

| | | | |
|---|---|---|---|
| 1,032,925 | 5/1910 | Miller | 153—64.5 |
| 1,321,853 | 11/1919 | Sailer. | |
| 1,920,154 | 7/1933 | Carlson | 153—64.5 |
| 1,970,536 | 8/1934 | Mansur | 153—64.5 |
| 2,177,359 | 9/1939 | Campbell | 83—342 |
| 2,539,379 | 1/1951 | Wright | 83—300 |
| 2,595,791 | 5/1952 | Hunt | 29—155.55 X |
| 2,661,707 | 12/1953 | Clement. | |
| 2,788,436 | 4/1957 | Young et al. | 29—155.53 X |

FOREIGN PATENTS 793,545  4/1958  Great Britain.

JOHN F. CAMPBELL, *Primary Examiner.*

WHITMORE A. WILTZ, *Examiner.*

R. W. CHURCH, *Assistant Examiner.*